Feb. 6, 1962  W. HELLING ET AL  3,020,220
CONTINUOUS CARBON ELECTRODE
Filed Nov. 29, 1957  2 Sheets-Sheet 1

INVENTORS
Werner Helling
and Robert Lenfe
BY
Michael S. Striker
ATTORNEY

INVENTORS
Werner Helling
and Robert Lampe
BY
Michael J. Striker
ATTORNEY 3,020,220
CONTINUOUS CARBON ELECTRODE
Werner Helling, Grevenbroich, Lower Rhine, Germany (Auerfelderstrasse 2, Munich 9, Germany) and Robert Lange, v. d. Portsendstrasse 9, Grevenbroich, Lower Rhine, Germany
Filed Nov. 29, 1957, Ser. No. 699,820
Claims priority, application Germany Sept. 9, 1952
15 Claims. (Cl. 204—67)

The present invention relates to continuous carbon electrodes, as well as to a method of making and using the same. Particularly, the present invention relates to continuous carbon electrodes for use in electrical furnaces and electrolytic cells. The present invention is of special interest in connection with the electrolytic production of aluminum from a molten alumina-containing electrolyte.

The present application is a continuation-in-part of our copending applications Serial No. 375,018, filed on August 18, 1953, and entitled "Continuously Formed Electrodes," and Serial No. 547,863, filed on November 18, 1955, and entitled "Method of Producing Aluminum," both now abandoned.

It is known to use self-baking continuous electrodes for the continuous operation of electric furnaces in which carbon electrodes are employed such as for instance the electric cells used in the electrolysis of fused electrolytes for the production of aluminum. It is also known to operate with solid preburned carbon electrodes in such a manner that on top of the operating electrode blocks new carbon electrode blocks are positioned. Thereby it is of particular importance that a stable, good electrically conductive connection is established between superposed carbon electrode blocks. So far, it has been attempted to achieve satisfactory connection of superposed electrode blocks by connecting these blocks in a locking manner for instance by threaded connections or with dovetailed joints.

Apart from the manipulative complications in thus connecting superposed carbon blocks, it is also not possible to assure in this manner an electrically conductive connection since the effective contact areas between the carbon blocks are relatively small. It has therefore also been suggested to superpose preburned carbon blocks without threading or dovetailing the same, but by forming the adjacent faces of superposed carbon blocks with recesses which are so arranged that openings are formed into which metal bolts or cementing materials can be introduced so as to prevent separation of the two carbon blocks by acting as locking members. These locking members are thereby exposed to shearing forces and must be capable of withstanding the same. In addition, it has been proposed to introduce between superposed preburned carbon blocks a thin layer of electrically conductive material for the exclusive purpose of improving the electric connection between the two carbon blocks. This thin layer is neither capable of nor intended for improving the firmness and strength of the connection between the two carbon blocks.

It is therefore an object of the present invention to overcome the aforementioned difficulties in forming continuous carbon electrodes of individual preburned carbon blocks.

It is another object of the present invention to provide a method of forming a continuous preburned carbon electrode in a simple and economical manner.

It is a further object of the present invention to provide a preburned carbon block of such configuration that the same can be easily assembled into a continuous carbon electrode.

It is yet another object of the present invention to provide a continuous carbon block arrangement including individual preburned carbon block electrodes which are superposed and firmly bonded to each other.

It is still another object of the present invention to provide a system of continuously forming an electrode of preburned carbon blocks which in a simple and economical manner will allow continuous operation of the electric furnace or cell containing the electrode with a minimum of operational difficulties.

Other objects and advantages of the present invention will become apparent from a further reading of the description and the appended claims.

With the above and other objects in view, the present invention includes a method of forming a continuous carbon electrode, comprising the steps of interposing between a lower preburned carbon electrode block having an upper face extending substantially in horizontal direction and an upper preburned carbon electrode block having a lower face extending substantially in horizontal direction, a layer of an unburned carbonaceous material in plastic condition adhering to the electrode faces and consisting essentially of an intimate mixture of a carbonizable binder composition and of carbon particles having a maximum size of about 3 mm., said layer substantially completely filling the space between the preburned carbon electrodes, and heating the layer at the carbonization temperature of the carbonizable binder material so as to carbonize the same and thereby harden the layer while it adheres to the electrode faces, thereby firmly bonding the upper and lower preburned carbon electrodes to each other.

The present invention also contemplates a system of continuously forming an electrode, comprising the steps of uniting a lower carbon block with a superimposed upper carbon block by a layer of bonding material composed of unburned electrode composition to form an electrode, supporting the lower block by a raisable rod having an expansible head removably secured in a blind bore in the lower block, and extending through a bore in the upper block, lowering the electrode as the lower block is consumed, removing the rod before the blind bore is reached, the lower block being secured to the upper block by the bonding material, and simultaneously supporting the upper block by a second rod extending into a blind bore in the upper block.

It is also within the scope of the present invention to provide a continuously formed electrode, comprising in combination a lower carbon block having a vertical blind bore therein, a supporting rod having an expansible head removably secured in the bore, an upper carbon block superimposed upon the lower block and secured thereto by a layer of unburned electrode composition, and a second vertical bore in the upper block, the supporting rod extending through the second vertical bore.

According to the present invention, the individual preburned carbon electrode blocks are connected with each other in such a manner that between the horizontal connecting faces of the carbon blocks a layer of a binder material is introduced, which layer is coked or carbonized under the influence of the electric furnace or electric cell temperature, whereby a firm, electrically conductive connection between the carbon blocks is obtained without interlocking arrangements. The binder material according to the present invention has a composition which corresponds substantially to the composition of an unbaked electrode mass. Preferably, the binder material is composed of between 26 and 35% of carbonizable binder material, 27 to 36% of carbon particles having a grain size of up to 0.2 mm., 15 to 27% carbon particles of a grain size between 0.2 and 1 mm., and 9 to 15% carbon particles having a grain size of between 1 and 3 mm.

According to the present invention, the carbon electrode blocks are formed with substantially horizontally extending connecting faces, and the connecting layer has preferably a thickness of at least 5 mm., most preferably of between 10 and 15 mm.

The consistency of the binder material according to the present invention is such that upon slight heating of the material to a temperature of above 75° C., or by addition of a suitable solvent, the binder material will become plastic so that the same can be well and densely applied between the adjacent faces of the carbon block electrodes. However, the binder material will not be liquified to such an extent that it would flow out laterally under the weight and pressure of the superposed carbon electrode blocks at temperatures below the coking or carbonization temperature of the binder material. Thus, the consistency of the binder material when applied and below the coking temperature thereof will be approximately the same as the consistency of mortar used in erecting brick walls. The desired consistency of the binder material according to the present invention is achieved and controlled by the distribution and range of the grain sizes of the carbon or coke constituents of the binder materials.

While, as stated above, the connecting faces of adjacent carbon blocks are substantially horizontally arranged, it is desirable according to a preferred embodiment of the present invention to so form the adjacent carbon block faces that lateral movement of superposed carbon blocks is prevented.

In order to further impede lateral emergence of the binder material and also in order to simultaneously enlarge the area of the adjacent or connecting carbon block surfaces, it is preferred according to the present invention to provide one or both of the adjacent carbon block faces with ribs, preferably, with ribs running parallel to the edges of the carbon block faces. Accordingly, in the case of carbon blocks having a round horizontal cross section, the ribs will be arranged in the form of concentric circles.

It is also possible to apply the layer of plastic binder material in spaced strips rather than in a continuous layer covering the entire connecting face of one of the two carbon blocks. The thickness of such strips of binder material is then to be such that after even distribution of the binder material between the two carbon blocks so as to completely cover the two adjacent faces of the carbon blocks, a layer of binder material having a thickness of at least 5 mm., preferably however, between 10 and 15 mm., is obtained.

It is the advantage of applying the binder material in the form of strips or otherwise to apply the binder material to relatively small portions of the connecting carbon block area, that it has been found that upon superposing of the carbon blocks in this manner a continuous connecting layer of binder material is formed which is of more even density than can be obtained by initially applying the binder material over the entire connecting area.

The connecting faces of the carbon blocks may also be formed with shallow indentations and projections in place of the ribs discussed above, whereby preferably the two connecting faces are so formed that indentations in one of the faces are juxtaposed with similarly shaped projections on the other face, so that after joining of the two carbon blocks, the layer of binder material between the two faces will have substantially the same thickness throughout.

In the last discussed case, it is particularly simple to apply the layer of binder material. The hot, viscous mass is poured over the connecting face of one of the two carbon blocks and excess binder material is drawn off with a ruler or the like. In this manner, the indentations in the face remain filled with binder material. The number and dimensions of the indentations is preferably so adjusted that the quantity of binder material remaining therein will be sufficient to form a continuous interposed layer of at least 5 mm., preferably between 10 and 15 mm. thickness between the two carbon blocks.

The binder material which is interposed between the two preburned carbon electrode blocks will be baked (i.e. carbonized) by being exposed to the heat of the electric furnace or cell which acts on the electrode comprising the two joined preburned carbon blocks and the intermediate binder layer. Thereby, the layer of binder material is solidified and made electrically conductive so that the layer of binder material after complete solidification firmly bonds the two carbon blocks together and is capable to securely carry the lower block and to conduct electric current from one block to the other. Thereby, the solidified binder layer is exclusively exposed to tension stress and connects the carbon blocks without any additional connecting or holding devices, particularly without any locking arrangement such as threads, dovetail arrangements, locking members, grooves and tongues or the like. The binding material, after heat solidification, firmly adheres to the adjacent faces of the carbon blocks and sufficiently bonds the same together so that in this manner lower carbon blocks weighing 1,000 kilograms or more can be carried by the upper carbon blocks. Basically, the composition of the binder material is the same as the composition used for unburned electrode masses and consists of solid granulated types of carbon such as are used for electrodes, for instance petroleum coke, pitch coke, anthracite, soot or graphite, together with a binder composition such as pitch of a type having a high coking residue of more than 30%. To the above mixtures preferably other substances are added in small quantities in order to improve the consistency of the hot mixture, its slidability, its coking properties, the wetting of the carbon grains, and the firmness of the baked or carbonized mixture.

By way of example only and without limiting the present invention to the specific components and quantitative relationships shown, the following Table I lists several examples of binder materials according to the present invention which give excellent results.

These binder materials have a softening point of about 100° C. and are thickly liquid at temperatures of between 120 and 150° C. at which temperatures the materials are best suited for being applied to the connecting faces of the carbon blocks. Solidification of these binder materials starts at temperatures of between 300 and 400° C. and is substantially completed at temperatures of about 600° C.

*Table I*

| Binder Material Constituents | Example Number | | | |
|---|---|---|---|---|
| | 1, percent (by weight) | 2, percent (by weight) | 3, percent (by weight) | 4, percent (by weight) |
| Petroleum coke, 0-0.2 mm | 26 | | 5 | 28 |
| Petroleum coke, 0.2-1 mm | 22 | | | 20 |
| Petroleum coke 1-3 mm | 15 | | | 13 |
| Pitch coke, 0-0.2 mm | | 26 | 7 | |
| Pitch coke, 0.2-1 mm | | 20 | 20 | |
| Pitch coke, 1-3 | | 14 | 13 | |
| Soot | 3 | 5 | 2 | 3 |
| Graphite | 2 | 2 | 20 | |
| Machine oil | 2 | | 1 | 1.6 |
| Naphthalene | 2 | 0.8 | 2.8 | |
| Ammonium persulfate | | 0.2 | | 0.2 |
| Sulphur | 1.8 | | | 1 |
| Pitch (softening point, 75° C.) | 23 | 25 | 23 | 26 |
| Tar oil | 3 | 7 | 6 | 7 |
| Isopropylnaphthalene-sodium sulfonate | 0.2 | | 0.2 | 0.2 |

The clamping jaws, contacts, nipples or other current-supplying and supporting members may be attached to the carbon block electrodes either laterally or from the top. In the latter case so-called clamping nipples are preferably used. Clamping nipples are rods which are provided with a usually cylindrical head. The clamping nipple is introduced headfirst into a vertical bore in the carbon electrode block. Corresponding to the consumption of the electrode in the furnace or cell from time to time the nipples are pulled upwardly within the vertical bore of the electrode.

According to the prior art, the electrode consisting of two or more superposed carbon blocks was provided with vertical bores throughout, into which the cylindrical head of the clamping nipple was introduced in such a manner that the nipple by spreading of its head could be firmly connected with the respective carbon block. To the extent to which the electrode was consumed, for instance when the carbon electrode serves as anode in an aluminum-producing cell, the nipple moves lower and lower with the lowest carbon block and after some time reaches the level of the molten electrolyte. Up to now, at this point the nipples were loosened and pulled upwardly so that a burning off of the nipple and consequently contamination of the electrolyte could be avoided. It cannot be avoided according to the above-described method of operation that the heads of the nipple come close to the hot electrolyte and consequently are strongly heated and prematurely made useless. Furthermore, reaction gases containing considerable quantities of carbon dioxide pass upwardly through the open bores. The flow of the reaction gas is furthered by the flue effect of the open bore. These reaction gases react with the carbon of the anode and cause changes in the shape of the bore holes.

The above-described disadvantages are avoided, according to the present invention, by providing the carbon blocks in addition to the bore holes which pass through the entire carbon blocks in vertical direction, also with blind bores which extend from the upper face of the carbon block towards the lower face of the block without however reaching the lower face. When using an anode which for instance consists of two superposed carbon blocks which are connected to each other according to the present invention as described above, the current-carrying nipples extend through a bore in the upper block into a blind bore in the lower block, carry the anode and also carry electric current to the same. In addition, in the upper carbon block blind bores are provided and nipples are also fastened to the interior of the blind bores in the upper carbon block. As soon as the lower block is so far consumed that the blind holes therein might become open holes, and that electrolyte or reaction gases might enter into the same, the nipples which were fastened to these blind holes are pulled out and the nipples which previously had been fastened in the blind holes of the superposed carbon blocks are activated for carrying the entire electrode and for supplying current thereto. At the same time, it is also possible to superpose upon the upper carbon block a third carbon block, also provided with bores throughout and with blind bores and to repeat in this manner the above-described operation so as to assure continuous functioning of the electric cell or furnace. It is of course necessary to disconnect all of the nipple carrying rods while superposing the third carbon block so that during this operation the entire electrode has to be carried by an auxiliary device.

Finally, it is also possible to provide the carbon block already prior to positioning the same on the operating carbon electrode, with all the required implements for carrying the same and for conducting current thereto, such as clamping jaws, nipples and the like, and to superpose the thus prepared carbon block onto the operating electrode and to adhere the thus superposed carbon block to the operating carbon electrode in the manner described further above.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
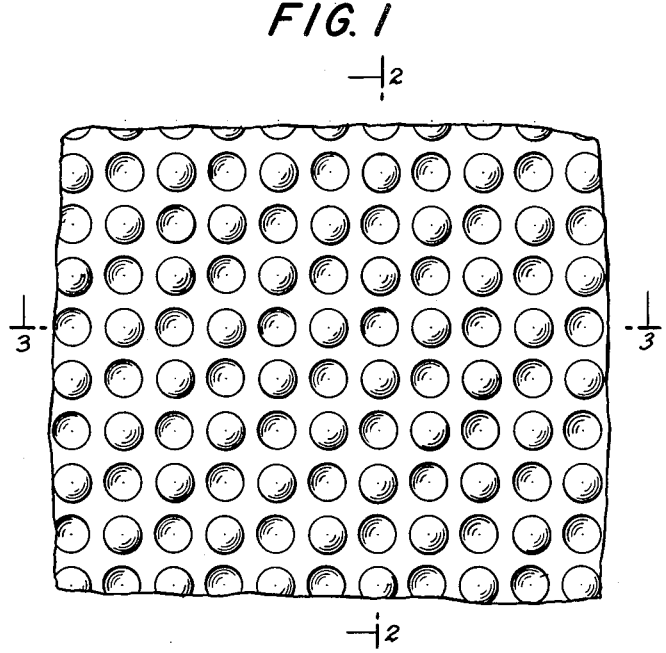
FIG. 1 is a plan view of a portion of a carbon electrode block according to the present invention.
Figure 3:
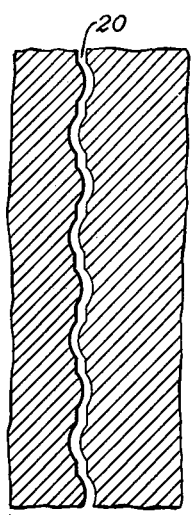
FIG. 3 is a cross sectional view of the carbon block electrode illustrated in FIG. 1, taken along the line b—b in FIG. 1.
Figure 2:
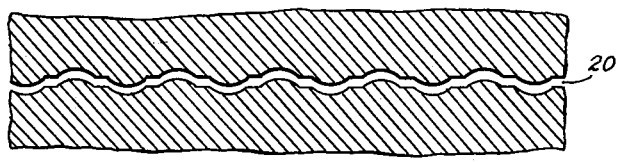
FIG. 2 is a cross sectional view of the carbon electrode block illustrated in FIG. 1, taken along the line a—a in FIG. 1.

Referring now to the drawings, and particularly to FIG. 1, the upper face of a carbon block according to the present invention is shown, which upper face is provided with shallow indentations and projections. As can be seen from the cross sectional views illustrated in FIGS. 2 and 3, the shallow indentations and projections of the superposed carbon block faces correspond to each other and are arranged in mating configuration so that interposed layer 20 will be of substantially even widths throughout. The indentations and configurations may also be of rib-like or wave-like configuration, and it is also within the scope of the present invention to provide only one of the two adjacent carbon block faces with such shallow indentations and projections, or even to superpose carbon blocks with completely flat adjacent faces.

Figure 5:
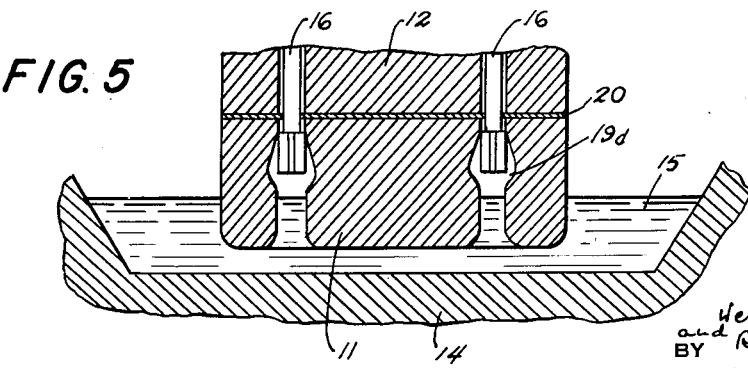
FIG. 5 is an elevational view of part of the device shown in FIG. 4, also illustrating deformation of the carbon block occurring during operation of the electrode.
Figure 4:
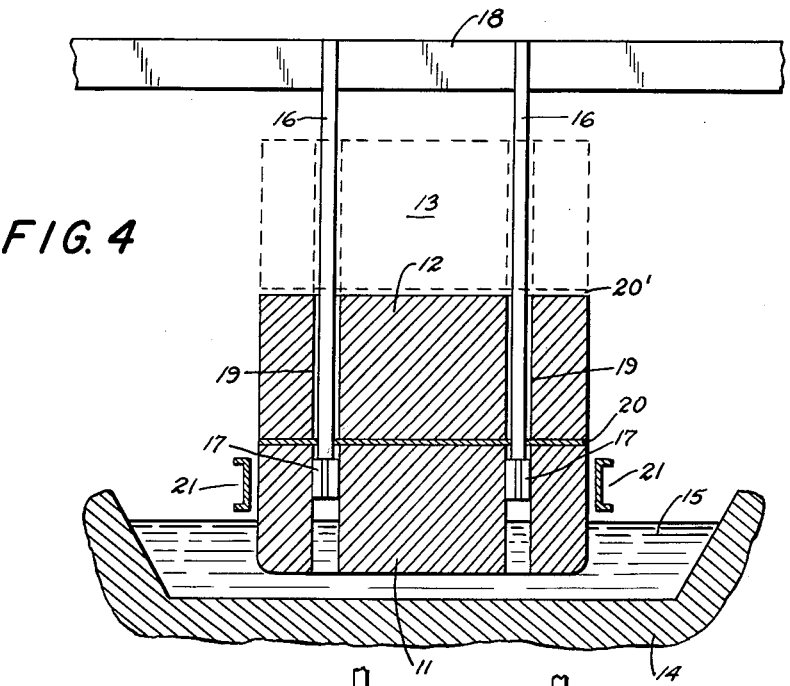
FIG. 4 is a schematic elevational view of a continuous carbon block electrode according to the present invention, provided with conventional supporting rods having expansible heads.

As schematically illustrated in FIG. 4, the continuous electrode comprises carbon blocks 11 and 12 which are adhered to each other by intermediate layer 20. As illustrated, the continuous carbon electrode consisting of carbon blocks 11, 12 and intermediate layer 20 serves for instance as anode in an aluminum-producing cell. The cathode is indicated by numeral 14 and the molten electrolyte by numeral 15. Clamping nipples 16 provided with cylindrical expansible heads 17 are introduced into vertical bores 19 and are firmly connected with the carbon block electrode by spreading of the expansible heads 17. The nipples are mounted on supporting beam 18 which thereby carries the electrode and also conducts electrical current to the same. Supporting beam 18 can be moved upwardly and downwardly by conventional means such as a hoisting mechanism (not shown). By downward movement of the supporting beam 18, the distance of anode 11 from cathode 14 is maintained as desired during the consumption of the lower portion of electrode 11 which is in contact with the molten electrolyte. During this downward movement, nipple 16 moves downwardly together with carbon block 11 while carbon block 11 is slowly consumed. Thereby nipple 16 eventually reaches the level of the molten electrolyte. At this point, nipple 16 has to be loosened and drawn upwardly so that heads 17 will then be located in carbon block 12. During the upward movement of the nipple, the electrode has to be temporarily supported by an auxiliary device indicated by clamping jaws 21. After carbon block 11 has been consumed, carbon block 13 will be superposed upon carbon block 12 and carbon blocks 12 and 13 will be adhered to each other by an intermediate layer according to the present invention, indicated by reference numeral 20'. While it is possible to operate a continuous electrode in the above-described manner, it cannot be avoided thereby that expansible heads 17 are strongly heated and prematurely rendered useless due to their eventual position in close proximity to the molten electrolyte, which molten electrolyte, for instance in the case of an aluminum-producing cell has a temperature of about 1,000° C. Furthermore, reaction gases containing considerable quantities of carbon dioxide rise from the lower face of the lowest electrode carbon block through the bores 19 in upward direction. The rising of these gases is facilitated by the flue effect of bores 19. The carbon dioxide reacts with the carbon walls of bores 19 under formation of carbon monoxide and consumption of carbon so that portions of the bore holes are widened as indicated in FIG. 5 by reference numeral 19d.

Figure 6:
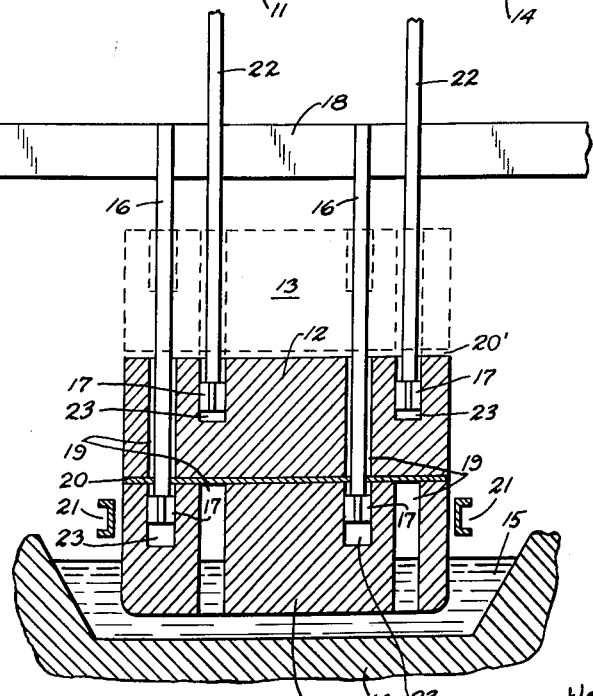
FIG. 6 is a schematic elevational view of a continuous carbon block electrode according to the present invention provided with a supporting rod arrangement according to the present invention.

The above-described disadvantages are avoided according to the arrangement illustrated in FIG. 6 in which the carbon blocks are formed with vertical bores 19 extending throughout the entire carbon block from its upper face to its lower face, and also with blind bores 23 which extend from the upper face of the individual carbon blocks only partly through the same. As long as the anode is formed of carbon blocks 11 and 12, nipples 16 are attached to block 11, carry the entire anode and also conduct electric current to the same. However, nipples 22 are also introduced into blind bores 23 of carbon block 12. As soon as carbon block 11 has been consumed to such an extent that the danger of flowing of electrolyte into bores 23 of block 11 exists, nipples 16 are removed, and nipples 22 take over the function previously carried out by nipples 16, namely the supporting of the entire carbon block electrode and the conducting of electric current to the same. Further carbon block 13 is then superposed upon carbon block 12 and the entire operation is repeated when carbon block 12 has been consumed to a point close to the lower end of blind bore 23. The individual carbon blocks 11, 12, 13, etc. are bonded to each other by intermediate layers 20 and 20', formed according to the method of the present invention as described further above.

It will be clear from the foregoing that according to the arrangement illustrated in FIG. 6, it is avoided that the head of the nipple will be damaged by the hot electrolyte and also the passing of gases through the bore holes is prevented. Bore holes 19 are always closed at their upper ends by the superposed carbon blocks, in this case carbon block 12, so that a flue effect is prevented. After removal of the nipple from the lower carbon block, it is possible to close the bore holes 19 and 23 for instance by plugging the same with a suitable substance such as a substance selected from the group consisting of alumina and synthetic carbonaceous materials.

Without in any way limiting the present invention to the specific details described herein, individual preburned carbon blocks forming part of the electrode according to the present invention, may, for instance, have a length of 2500 mm., a width of 580 mm. and a height of 560 mm. Such blocks weigh about 1260 kg. and have a capacity of 10,000 amperes.

Continuous carbon electrodes according to the present invention are particularly advantageous when used in furnaces or cells for the electrolytic production of aluminum from molten electrolyte, having an amperage of more than 50,000 amperes. In such cells, a molten electrolyte indicated in FIGS. 4–6 by reference numeral 15, consisting of cryolite in which about 5% alumina are dissolved, is decomposed by direct current. Liquid aluminum is formed at the cathode 14 and oxygen at the anode 11. The oxygen oxidizes the anode and in this manner carbon dioxide and carbon monoxide are formed which emanate from the cell in gaseous form. By this reaction, the lower portion of the anode is consumed and consequently the anode has to be replenished from time to time by superposing additional carbon blocks 12 and 13 and bonding the same to the lower carbon block. The voltage in such aluminum-producing electrolytic cells is about 5 volts. Cells of lesser load such as about between 10,000 and 15,000 amperes with which the development of the aluminum industry started and which still today are used in many installations are formed with between about 10 and 16 discontinuous block anodes in each cell. Each of the individual discontinuous carbon block anodes has a cross section of between about 700 and 1,000 square centimeters and is used up until only between about 5 and 10% of its original weight remains. Thereafter, the nearly completely consumed discontinuous carbon block anodes are removed and replaced by new similar anodes.

The increase in the production of aluminum required the installation of larger cell units. While it is already difficult and complicated to suspend and exchange the relatively small and discontinuous carbon block anodes which are required in small cell units, in the case of larger cell units due to the greater number of discontinuous carbon block anodes therein, a cell structure is required which is expensive to build and operate. It has been attempted to replace in large cell units such as units having a capacity of 30,000 amperes or more, the many small discontinuous anodes with a smaller number of large discontinuous anodes. However, upon removal of the remainder of a used-up large anode and replacement of the same with a new large anode, a cooling of the molten electrolyte takes place which in the case of large anodes is so severe that the operation of the cell is thereby disturbed. Consequently, the replacement of a large number of small discontinuous carbon block anodes with relatively few larger dsicontinuous carbon block anodes does not solve the existing problem. The abovedescribed difficulties have been to some extent overcome by the use of self-baking anodes.

Self-baking anodes operate continuously, i.e. as the lower portion of the anode is used up in the molten electrolyte, unburned anode mass is added at the upper end so that it is not necessary as in the case of discontinuous carbon block anodes, to remove used-up anode portions. The cell temperature is sufficiently high to bake the anode while the same is slowly lowered into the cell so that the lower portion of the mass which is immersed into the molten electrolyte in the cell is suitable to operate as anode. It is the advantage of the continuous self-baking anodes in the case of larger electrolytic cells that due to their continuous operation, it is possible to use anodes of large cross section and thereby to simplify the positioning of the anode, the conducting of electric current to the same and generally the operation of the cell. Consequently electrolytic cells provided with self-baking anodes usually have only one or two anodes of large cross section. The further development of the aluminum industry required further enlargement of the cell units. Consequently it was attempted to further increase the size and capacity of cells provided with self-baking anodes. However, it has been found that in the operation of large cell units, particularly such having a capacity exceeding 50,000 amperes or about 350 kilograms of aluminum production per day, new and unexpected difficulties arose. The consumption of anode material in relation to the quantity of aluminum produced increases strongly, the temperature conditions within the cell are difficult to control and the current yield is reduced, so that economic operation of cells having a capacity exceeding 50,000 amperes cannot be achieved with self-baking electrodes. While it is consequently not feasible to use self-baking anodes for cells of high current load, it is also not possible to use in such cells preburned discontinuous carbon block anodes because of the difficulties described further above. These difficulties consist in the necessity of providing in each cell a great number of relatively small anodes since the necessity of removal of the anode remainders and replacement of the same with new anodes does not permit the use of only few but much larger anodes in each cell.

According to the present invention it is now possible to operate electrolytic cells for the production of aluminum in units having a capacity of 50,000 amperes or more in an economically technically advantageous manner. By the use, according to the present invention, of large continuous anodes consisting of carbon blocks which have been prebaked at temperatures of between 1100 and 1400° C. or more, it is possible to overcome the disadvantages which previously existed in the case of preburned anode blocks and which primarily consisted in the requirement of introducing new anode blocks after removal of the substantially consumed anodes whereby due to cooling of the molten electrolyte, etc. the operation of the cell was impaired. By using the continuous prebaked anodes according to the present invention, it is possible to avoid the above-described difficulties because the anodes need not be exchanged but remain continuously in the cell.

Thus, the disadvantages of self-baking anodes which appear when such self-baking anodes are used in electrolytic cells of very large capacity, are avoided by the introduction of preburned carbon replacement blocks in such a manner as to thereby form a continuous anode. At the same time, the advantages of self-baking anodes, namely continuous operation, is fully retained with the anodes according to the present invention. Self-baking anodes cannot withstand the condition in electrolytic cells for the aluminum production having a capacity of more than 50,000 amperes. It has been found that the self-baking anodes are particularly attacked by the temperatures which probably occur at the contact areas between anode and molten electrolyte. Further investigations have shown that this disadvantage of large self-baking anodes is due to the relatively low baking temperature of such anodes which in electrolytic cells were baked at the temperature of between about 950 and 1000° C. Thus, self-baking anodes cannot advantageously be used in large cell units, while in contrast thereto the continuous prebaked carbon anodes according to the present invention are free of the above disadvantages.

Experiments carried out at the laboratory as well as in the actual operation of electrolytic cells have shown that under equal conditions the self-baking carbon anodes are attacked much more strongly than prebaked carbon anodes.

It has for instance been found that under otherwise equal conditions, the loss of anode material due to the attack of oxygen emanating from an oxidizing salt fusion amounted in the case of a normal self-baking anode to 70%, and in the case of a self-baking anode of highest resistance against chemical attack to 50%; in the case of a normal preburned carbon anode to only 10%, and in the case of a preburned anode of particularly high resistance against chemical attack to less than 5%.

A further experiment comparing self-baking anodes with continuous prebaked anodes according to the present invention in the production of aluminum in electrolytic cells having a capacity of more than 50,000 amperes has clearly shown that the self-baking anodes cannot withstand the attack of the molten electrolyte under such conditions while the continuous carbon block anodes according to the present invention permitted troublefree operation of the cell.

It will be understood that each of the elements described above, or two or more together, may also find a useful application in other types of preburned continuous carbon block electrodes differing from the types described above.

While the invention has been illustrated and described as embodied in an electrode arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A continuously formed electrode, comprising in combination, a lower carbon block having a vertical blind bore therein; a supporting rod having an expansible head removably secured in said bore; an upper carbon block superimposed upon said lower block and secured thereto by a layer of unburned electrode composition; and a second vertical bore in said upper block, said supporting rod extending through said second vertical bore.

2. A system of continuously forming an electrode, comprising the steps of uniting a lower carbon block with a superimposed upper carbon block by a layer of bonding material composed of unburned electrode composition to form an electrode; supporting said lower block by a raisable rod having an expansible head removably secured in a blind bore in said lower block, and extending through a bore in said upper block; lowering said electrode as said lower block is consumed; removing said rod before said blind bore is reached, said lower block being secured to said upper block by said bonding material; and simultaneously supporting said upper block by a second rod extending into a blind bore in said upper block.

3. A system as in claim 2, further comprising plugging said blind bore in said lower block and the continuing bore in said upper block after the rod has been withdrawn from said bores.

4. A system as in claim 3, the plugging substance being selected from the group consisting of alumina and synthetic carbonaceous materials.

5. In an electrolytic cell, a preburned carbon electrode block having an upper and a lower face, said faces extending substantially in horizontal direction, said preburned carbon block being formed with a plurality of vertical bores extending from said upper face to said lower face and being adapted to receive current supplying members, and also being formed with a plurality of blind bores extending in vertical direction from said upper face towards said lower face terminating spaced from the same.

6. In an electrode arrangement, in combination, a preburned carbon electrode block having upper and lower faces extending substantially in horizontal direction, said carbon block being formed with at least two vertical bores extending from said upper face to said lower face and with at least two blind bores extending in vertical direction from said upper face towards said lower face; first supporting rods having expansible heads extending through said vertical bores; and second supporting rods having expansible heads secured with said expansible heads in said blind bores, said supporting rods being adapted to also serve as current supplying members.

7. In an electrolytic cell, in combination, a continuous carbon block electrode comprising an upper and a lower carbon block having substantially horizontally extending upper and lower faces and being superposed upon each other, said carbon blocks being formed with a plurality of vertical bores extending from the upper face of the respective carbon block to the lower face thereof, and also being formed with a plurality of blind bores extending vertically from the upper face of the respective carbon block towards but spaced from the lower face thereof, at least two of said plurality of vertical bores of said upper carbon block being aligned with two of said blind bores of said lower carbon block forming channels extending from the upper face of the upper carbon block into the interior of the lower carbon block, each of said channels being adapted to receive a current supplying member, whereby due to termination of said channel spaced from the lower face of said lower carbon block communication through said channel between the area in the vicinity of the lower face of the lower carbon block and the area in the vicinity of the upper face of the upper carbon block will be prevented without interference with the insertion of said current supplying member.

8. In an electrolytic furnace, in combination, a hot molten electrolyte in the lower portion of the furnace; a lower preburnt carbon electrode block having an upper face and a lower portion; an upper preburnt carbon electrode block having a lower face and adapted to be placed with said lower face thereof upon said upper face of said lower preburnt carbon electrode block with a layer of unburnt carbonizable binder material between said upper face of said lower preburnt carbon electrode block and said lower face of said upper preburnt carbon electrode block; means engaging only said lower preburnt carbon electrode block for holding the same during said placing of said upper preburnt carbon electrode block thereon and for lowering during operation of said furnace said lower preburnt carbon electrode block with said upper preburnt carbon electrode block placed thereon with said layer of unburnt carbonizable binder material therebetween, whereby during such lowering said layer of unburnt carbonizable binder material will harden when it reaches within said furnace a zone sufficiently hot to carbonize and harden said carbonizable material and to cause the thus hardened layer to firmly connect said electrode blocks to each other; and means engaging only said upper preburnt carbon electrode block for holding the same and further lowering said upper preburnt carbon electrode block with said lower preburnt carbon electrode block firmly connected thereto by said hardened layer of binder material, so that after engagement of said upper preburnt carbon electrode block said lower preburnt carbon electrode block may be disengaged from said means engaging the same.

9. In an electrolytic furnace, in combination, a hot molten electrolyte in the lower portion of the furnace; a lower preburnt carbon electrode block having an upper face and a lower portion; an upper preburnt carbon electrode block having a lower face and adapted to be placed with said lower face thereof upon said upper face of said lower preburnt carbon electrode block with a layer of unburnt carbonizable binder material between said upper face of said lower preburnt carbon electrode block and said lower face of said upper preburnt carbon electrode block; holding means movable between a holding position holding said lower preburnt carbon electrode block only during said placing of said upper preburnt carbon electrode block thereon with said layer of unburnt carbonizable binder material therebetween and a non-holding position permitting lowering of said lower preburnt carbon electrode block; first supporting and lowering means supporting only said lower preburnt carbon electrode block after said placing of said upper preburnt carbon electrode block with said layer of unburnt carbonizable binder material therebetween and for lowering after movement of said holding means from a holding into a non-holding position and during operation of said furnace said lower preburnt carbon electrode block with said upper preburnt carbon electrode block placed thereon with said layer of unburnt carbonizable binder material therebetween whereby during such lowering said layer of unburnt carbonizable binder material will harden when it reaches within said furnace a zone sufficiently hot to carbonize and harden said carbonizable material and to cause the thus hardened layer to firmly connect said electrode blocks to each other; and second supporting and lowering means for supporting only said upper preburnt carbon electrode block after said lower preburnt carbon electrode block is firmly connected thereto by said hardened layer of binder material and for further lowering both electrode blocks firmly connected to each other, so that after such supporting of said upper preburnt carbon electrode block by said second supporting and lowering means said first supporting and lowering means may be detached and withdrawn from said lower preburnt carbon electrode block.

10. A method of forming in an operating electrolytic furnace a continuous carbon electrode, comprising the steps of holding in an electrolytic furnace a lower preburnt carbon electrode block in a position in which its lower portion reaches into the hot molten electrolyte in said furnace and its upper face is spaced from the molten electrolyte above the same; placing on said upper face of said lower preburnt carbon electrode block while the same is held in said position in said furnace an upper preburnt carbon electrode block with a layer of unburnt carbonaceous binder material therebetween; engaging said lower preburnt carbon electrode block by first supporting and lowering means; discontinuing holding of said lower preburnt carbon electrode block in said position thereof; lowering said lower preburnt carbon electrode block by said first supporting and lowering means with said upper preburnt carbon electrode block placed thereon, whereby said layer of carbonaceous binder material reaches within said furnace a zone sufficiently hot to carbonize and harden said binder material and to thereby firmly connect said electrode blocks to each other; supporting said upper preburnt carbon electrode block at least after said lowering of said lower preburnt carbon electrode block by second supporting and lowering means; discontinuing engagement of said lower preburnt carbon electrode block by said first supporting and lowering means; and further lowering said electrode blocks firmly connected to each other by said second supporting and lowering means engaging only said upper preburnt carbon electrode block.

11. In an electrolytic furnace, in combination, a hot molten electrolyte in the lower portion of the furnace; a lower preburnt carbon electrode block having a substantially horizontal upper face and a lower portion; an upper preburnt carbon electrode block having a substantially horizontal lower face and adapted to be placed with said lower face thereof upon said upper face of said lower preburnt carbon electrode block with a layer of unburnt carbonizable binder material between said upper face of said lower preburnt carbon electrode block and said lower face of said upper preburnt carbon electrode block; holding means movable between a holding position holding said lower preburnt carbon electrode block only during said placing of said upper preburnt carbon electrode block thereon with said layer of unburnt carbonizable binder material therebetween and a non-holding position permitting lowering of said lower preburnt carbon electrode block; first supporting and lowering rod means supporting only said lower preburnt carbon electrode block after said placing of said upper preburnt carbon electrode block with said layer of unburnt carbonizable binder material therebetween and for lowering after movement of said holding means from a holding into a non-holding position and during operation of said furnace said lower preburnt carbon electrode block with said upper preburnt carbon electrode block placed thereon with said layer of unburnt carbonizable binder material therebetween whereby during such lowering said layer of unburnt carbonizable binder material will harden when it reaches within said furnace a zone sufficiently hot to carbonize and harden said carbonizable material and to cause the thus hardened layer to firmly connect said electrode blocks to each other; and second supporting and lowering rod means for supporting only said upper preburnt carbon electrode block after said lower preburnt carbon electrode block is firmly connected thereto by said hardened layer of binder material and for further lowering both electrode blocks firmly connected to each other, so that after such supporting of said upper preburnt carbon electrode block by said second supporting and lowering means said first supporting and lowering means may be detached and withdrawn from said lower preburnt carbon electrode block.

12. In an electrolytic furnace for the production of aluminum from an alumina-containing molten electrolyte, in combination, a hot molten electrolyte in the lower portion of the furnace; a lower preburnt carbon electrode block having a substantially horizontal upper face and a lower portion; an upper preburnt carbon electrode block having a substantially horizontal face and adapted to be placed with said lower face thereof upon said upper face of said lower preburnt carbon electrode block with a layer of unburnt carbonizable binder material between said upper face of said lower preburnt carbon electrode block and said lower face of said upper preburnt carbon electrode block; holding means movable between a holding position holding said lower preburnt carbon electrode block only during said placing of said upper preburnt carbon electrode block thereon with said layer of unburnt carbonizable binder material therebetween and a non-holding position permitting lowering of said lower preburnt carbon electrode block; first supporting and lowering rod means having expansible head means supporting only said lower preburnt carbon electrode block after said placing of said upper preburnt carbon electrode block with said layer of unburnt carbonizable binder material therebetween and for lowering after movement of said holding means from a holding into a non-holding position and during operation of said furnace said lower preburnt carbon electrode block with said upper preburnt carbon electrode block placed thereon with said layer of unburnt carbonizable binder material therebetween whereby during such lowering said layer of unburnt carbonizable binder material will harden when it reaches within said furnace a zone sufficiently hot to carbonize and harden said carbonizable material and to cause the thus hardened layer to firmly connect said electrode blocks to each other; and second supporting and lowering rod means having expansible head means for supporting only said upper preburnt carbon electrode block after said lower preburnt carbon electrode block is firmly connected thereto by said hardened layer of binder material and for further lowering both electrode blocks firmly connected to each other, so that after such supporting of said upper preburnt carbon electrode block by said second supporting and lowering means said first supporting and lowering means may be detached and withdrawn from said lower preburnt carbon electrode block.

13. A method of forming in an operating electrolytic furnace a continuous carbon electrode, comprising the steps of holding in an electrolytic furnace a lower preburnt carbon electrode block in a position in which its lower portion reaches into the hot molten electrolyte in said furnace and its upper face is spaced from the molten electrolyte above the same; placing on said upper face of said lower preburnt carbon electrode block while the same is held in said position in said furnace an upper preburnt carbon electrode block with a layer of unburnt carbonaceous binder material in plastic condition and consisting essentially of an intimate mixture of a carbonizable binder composition and of carbon particles having a maximum size of about 3 mm. interposed between said upper and lower preburnt carbon electrode blocks; engaging said lower preburnt carbon electrode block by first supporting and lowering means; discontinuing holding of said lower preburnt carbon electrode block in said position thereof; lowering said lower preburnt carbon electrode block by said first supporting and lowering means with said upper preburnt carbon electrode block placed thereon, whereby said layer of carbonaceous binder material reaches within said furnace a zone sufficiently hot to carbonize and harden said binder material and to thereby firmly connect said electrode blocks to each other; supporting said upper preburnt carbon electrode block at least after said lowering of said lower preburnt carbon electrode block by second supporting and lowering means; discontinuing engagement of said lower preburnt carbon electrode block by said first supporting and lowering means; and further lowering said electrode blocks firmly connected to each other by said second supporting and lowering means engaging only said upper preburnt carbon electrode block.

14. A method of forming a continuous carbon electrode in an operating electrolytic furnace for the production of aluminum from molten alumina-containing electrolyte, said furnace having a capacity of at least 50,000 amperes, comprising the steps of holding in an electrolytic furnace a lower preburnt carbon electrode block in a position in which its lower portion reaches into the hot molten electrolyte in said furnace and its upper face extends horizontally and is spaced from the molten electrolyte above the same; placing on said horizontally extending upper face of said lower preburnt carbon electrode block while the same is held in said position in said furnace an upper preburnt carbon electrode block with a layer of unburnt carbonaceous binder material in plastic condition having a thickness of at least 5 mm. and consisting essentially of an intimate mixture of a carbonizable binder composition and of carbon particles having a maximum size of about 3 mm. interposed between said upper and lower preburnt carbon electrode blocks; engaging said lower preburnt carbon electrode block by first supporting and lowering means; discontinuing holding of said lower preburnt carbon electrode block in said position thereof; lowering said lower preburnt carbon electrode block by said first supporting and lowering means with said upper preburnt carbon electrode block placed thereon, whereby said layer of carbonaceous binder material reaches within said furnace a zone sufficiently hot to carbonize and harden said binder material and to thereby firmly connect said electrode blocks to each other; supporting said upper preburnt carbon electrode block at least after said lowering of said lower preburnt carbon electrode block by second supporting and lowering means; discontinuing engagement of said lower preburnt carbon electrode block by said first supporting and lowering means; and further lowering said electrode blocks firmly connected to each other by said second supporting and lowering means engaging only said upper preburnt carbon electrode block.

15. A method of forming in an operating electrolytic furnace a continuous carbon electrode, comprising the steps of holding in an electrolytic furnace a lower preburnt carbon electrode block in a position in which its lower portion reaches into the hot molten electrolyte in said furnace and its upper face is spaced from the molten electrolyte above the same; placing on said upper face of said lower preburnt carbon electrode block while the same is held in said position in said furnace an upper preburnt carbon electrode block with a layer of unburnt carbonaceous binder material in plastic condition and consisting essentially of an intimate mixture of between about 26% and 35% of a carbonizable binder composition, between 27% and 36% of carbon particles having a maximum size of up to 0.2 mm., between 15% and 27% of carbon particles having a size of between 0.2 and 1 mm., and between about 9% and 15% of carbon particles having a size of between 1 mm. and 3 mm., interposed between said upper and lower preburnt carbon electrode blocks; engaging said lower preburnt carbon electrode block by first supporting and lowering means; discontinuing holding of said lower preburnt carbon electrode block in said position thereof; lowering said lower preburnt carbon electrode block by said first supporting and lowering means with said upper preburnt carbon electrode block placed thereon, whereby said layer of carbonaceous binder material reaches within said furnace a zone sufficiently hot to carbonize and harden said binder material and to thereby firmly connect said electrode blocks to each other; supporting said upper preburnt carbon electrode block at least after said lowering of said lower preburnt carbon electrode block by second supporting and lowering means; discontinuing engagement of said lower preburnt carbon electrode block by said first supporting and lowering means; and further lowering said electrode blocks firmly connected to each other by said second supporting and lowering means engaging only said upper preburnt carbon electrode block.

References Cited in the file of this patent

UNITED STATES PATENTS

| | | |
|---|---|---|
| 1,757,695 | Westly | May 6, 1930 |
| 1,785,587 | Kuhlmann | Dec. 16, 1930 |
| 2,527,595 | Swallen et al. | Oct. 31, 1950 |
| 2,650,943 | Leuchs et al. | Sept. 1, 1953 |
| 2,680,143 | Clegg et al. | June 1, 1954 |
| 2,728,109 | Bonnot | Dec. 27, 1955 |
| 2,758,964 | Liles | Aug. 14, 1956 |
| 2,769,113 | Graybeal | Oct. 30, 1956 |
| 2,937,980 | Schmitt et al. | May 24, 1960 |

FOREIGN PATENTS

| | | |
|---|---|---|
| 752,126 | Great Britain | July 4, 1956 |
| 913,805 | Germany | June 21, 1954 |
| 1,080,982 | France | June 2, 1954 |
| 1,123,484 | France | Sept. 21, 1956 |

OTHER REFERENCES

Industrial and Engineering Chemistry, vol. 47, No. 7, pp. 1412–1415, July 1955.